June 6, 1933.　　　　N. W. TRAUTNER　　　　1,912,872
TIRE LOCK FOR MOTOR VEHICLES
Filed Oct. 6, 1932
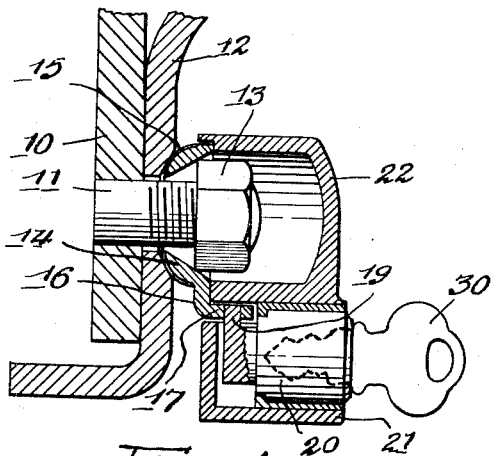
Fig. 1
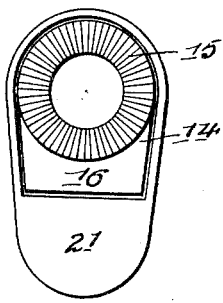
Fig. 2
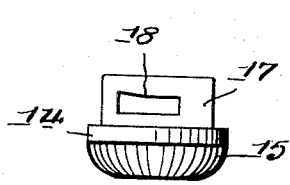
Fig. 3
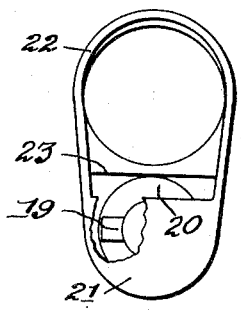
Fig. 4
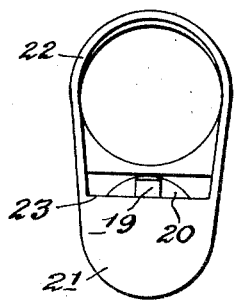
Fig. 5
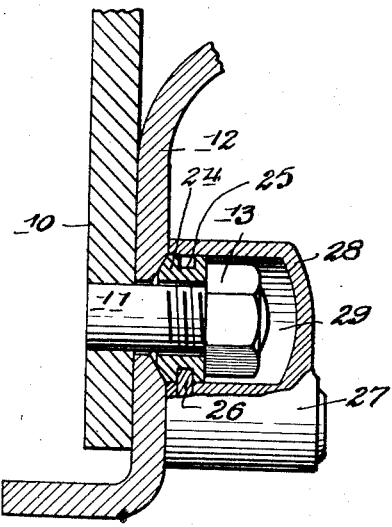
Fig. 6
Fig. 7
Inventor
NICHOLAS W. TRAUTNER
ROBERT J. KEENAN
By
Attorney Patented June 6, 1933

1,912,872

UNITED STATES PATENT OFFICE

NICHOLAS W. TRAUTNER AND ROBERT J. KEENAN, OF ST. PAUL, MINNESOTA, ASSIGNORS TO T AND A MANUFACTURING COMPANY, OF ST. PAUL, MINNESOTA, A CORPORATION OF MINNESOTA

TIRE LOCK FOR MOTOR VEHICLES

Application filed October 6, 1932. Serial No. 636,468.

This invention relates to a lock device for protecting tires against unauthorized removal from a motor vehicle and particularly to that class of such devices wherein a bolt head or nut is enclosed within a removable guard adapted to be locked in position.

It is our object to provide a novel tire guard adapted for more general use than other devices of this class and arranged to facilitate the attachment and removal of the guard.

Heretofore locks of this class have either required specially formed nuts for the stud bolts of the wheel mountings or they have been so constructed that a special wrench, such as a wrench of the socket type, is required for turning the nuts. Our invention has a washer-like member which is positioned between the nut or bolt head and the object to be held or guarded. It also has a separate casing having a locking connection with the washer-like member and the nut or bolt head is readily accessible for manipulation by hand and by the use of an ordinary tool, before the lock casing is applied.

The invention will be best understood by reference to the accompanying drawing in which:

Figure 1 is central, vertical section through our improved lock and the adjacent portions of a wheel or other object to be guarded and the support therefor;

Fig. 2 is a rear elevation of our device;

Fig. 3 is a bottom view of the preferred form of washer-like lock member.

Fig. 4 is a rear elevation of the lock casing with the washer-like member removed and with a portion of the casing broken away to show the locking finger in inoperative or unlocked position;

Fig. 5 is a rear elevation of the lock casing with the locking finger in operative position;

Fig. 6 is a section similar to Fig. 1 but showing an alternate form of the device, and Fig. 7 is a side elevation of the washer-like member shown in section in Fig. 6.

As shown in Figs. 1 and 6, the common or suitable wheel support is indicated by the numeral 10. Secured to the support 10 and projecting laterally therefrom, is a threaded stud 11 which passes through and projects from a part 12 of an automobile wheel or other object or accessory to be guarded. Threaded on the projecting end of the stud 11 is a nut 13.

In the preferred form of our device a washer-like member 14 is arranged to fit loosely on the stud 11 and to be confined between the nut 13 and part 12. The back face of the member 14 is fluted or roughened, as indicated at 15, and projecting from one side of said member is a tongue 16 having a laterally bent flange 17 adapted to be engaged by the lock. The flange 17 is formed with an elongated perforation or recess 18 adapted to receive a locking finger 19.

A lock 20 of the common type, adapted to be operated by the use of a removable key 30, is mounted eccentrically to the stud 11 in a casing 21. A guard cap 22 for the nut 13 is formed integral with the casing 21 to enclose the nut when in place on the washer-like member 14, as shown in Fig. 1. The casing 21 is formed with an opening 23 to receive the flange 17 on the tongue 16 and the finger 19 may be turned by the proper key in the lock 20 from inoperative position, shown in Fig. 4, to operative position, shown in Fig. 5. In the latter position said finger projects in the opening 23 and, when in use, makes locking connection with the flange 17 by engagement in the recess 18.

The alternate form of the device, shown in Figs. 6 and 7, has a washer-like member 24 formed to loosely fit on the stud 11 between the nut 13 and part 12. The periphery of the member 24 is formed with an annular groove 25 to receive a locking finger 26 similar to the finger 19. A casing 27, of alternate form, contains the lock proper in eccentric position and is formed with a guard cap 28 to receive the nut 13 and member 24. The finger 26 projects directly into a chamber 29 in the cap 28 and when the latter is in place on the nut and stud, the finger 26 may be projected into the annular groove 25 in the member 24. It will be understood that the finger 26, like the finger 19 is arranged to be operated by a key and turns in a plane extending perpendicular to the axis of the stud 11.

In use, a spare wheel or tire or other wheel of a vehicle may be secured to the support 10 by placing the part 12 in engagement with the stud 11 (the nut 13 having been removed). The washer-like member 14 is then applied to the stud and is fastened by turning the nut 13 into engagement with the threads on the stud in the usual manner. When this nut is tightened, the fluting at 15 bites into the part 12 to retain the washer against rotation out of any desired position. Now the cap 22 is placed over the nut 13 while the tongue 17 is inserted in the opening 23. Finally the locking finger 19 is operated to engage in the recess 18 in the flange 17 to complete the protection. It will be understood that the cap 22 encases and protects the nut 13 from unauthorized removal. Rotation of the lock cap 22 is prevented by the engagement of the tongue 17 with the casing 21 in the opening 23.

With the alternate form of the device shown in Figs. 6 and 7, the operation is similar to that described, except that the locking finger 26 enters the annular recess 25 in the washer-like member 24 to lock the cap 28 on the nut and rotation of the cap 28 about the axis of the bolt 11 is permitted by the annular recess 25. The preferred form of the device shown in Figs. 1 and 2 has the advantage over that shown in Figs. 6 and 7 and over other revoluble locks in that rotation of the housing on the stud is prevented in use and this makes the device particularly adapted for use on the running or rotating wheels of a vehicle where objectionable rattling noise would be caused by rotation of the lock.

It will be understood with reference to both forms of our device that the nut 13 may be readily manipulated by hand and by the use of pliers or other convenient tools in applying the nut to the stud 11 and making the connection tight because the sides of the nut are accessible. The invention has a further advantage as an accessory in that specially formed nuts 13 are not required. This makes the device applicable to the cars of a number of the popular kinds or makes, notwithstanding the fact that the studs 11 are variously threaded and the nuts furnished therewith, as car manufacturer's equipment, vary in form and size.

In the appended claims, the reference to a nut and stud bolt are to be understood as including the common substitutes for such nut and bolt such as cap screws or bolts having heads integral with the end to be guarded.

Having described our invention, what we claim as new and desire to protect by Letters Patent is:

1. In a lock of the class described, a member formed to loosely embrace the shank of a bolt and to be confined between a nut on said bolt and the object to be guarded, said member having a lock-engaging propection, a housing formed to cap said nut and to removably embrace said member, said housing being formed with walls extending at the sides of said nut and said sides being accessible for the manual operation of said nut to and from said member on the bolt upon removal of said housing, a lock mounted in said housing and a locking finger movable by said lock to engage said projection to retain said housing in engagement with said member.

2. A tire lock having in combination, a washer-like member formed to embrace the shank of a bolt and to be confined between a nut on said bolt and the object to be guarded, said member having a lock recess, a housing formed to cap said nut and member, said housing being removable without removing said nut and member from the bolt and having walls surrounding the sides of said nut in spaced relation thereto and said sides being accessible for the manual operation of said nut to and from said member upon removal of said housing, and a lock in said housing having a movable element to engage said washer-like member in said recess.

3. A guard for a bolt having a nut comprising a washer-like member slidably fitting on said bolt and formed to be confined thereon by said nut, a tongue projecting from a side of said member and formed with a perforation, a housing adapted to cap said nut and member and having an eccentric opening to receive said tongue, a lock mounted in said housing eccentric to said bolt and means operable by said lock for engaging said tongue in said recess to retain said housing on the bolt.

In testimony whereof, we have hereunto signed our names to this specification.

ROBERT J. KEENAN.
NICHOLAS W. TRAUTNER.